United States Patent [19]

Hsieh

[11] Patent Number: 5,383,729
[45] Date of Patent: Jan. 24, 1995

[54] HUB ASSEMBLY FOR A BICYCLE

[76] Inventor: Kinka Hsieh, No. 125, Shih Chien St., Fengyuan City, Taiwan, Prov. of China

[21] Appl. No.: 217,627

[22] Filed: Mar. 25, 1994

[51] Int. Cl.⁶ .................... F16C 19/49; B60B 27/00
[52] U.S. Cl. .................................. 384/545; 384/494
[58] Field of Search ............... 384/545, 494, 589, 580; 301/105.1; 74/594.2

[56] References Cited

U.S. PATENT DOCUMENTS

| | | | |
|---|---|---|---|
| 582,599 | 5/1897 | Brownell | 384/589 |
| 677,494 | 7/1901 | Bartholomew | 384/589 |
| 3,858,942 | 1/1975 | Humlong | 384/545 X |
| 5,002,407 | 3/1991 | Chi | 384/545 |
| 5,292,287 | 3/1994 | Hsieh | 474/151 |

Primary Examiner—Thomas R. Hannon
Attorney, Agent, or Firm—Poms, Smith, Lande & Rose

[57] ABSTRACT

A hub assembly for a bicycle includes an axle having a first end and a second end each defining an outer thread formed on a peripheral portion thereof. A hub member is rotatably mounted around the axle. A first bowl member and a second bowl member are respectively mounted in the first and second end portions of the hub member. A first cone member is threadedly engaged on the first end of the axle and has a first annular groove defined on an outer peripheral surface thereof. A first roller element is rotatably received in the first annular groove and bears against the first bowl member. A first ball bearing is rotatably mounted between the first bowl member and the first cone member. A second cone member is threadedly engaged on the second end of the axle and has a second annular groove defined on an outer peripheral surface thereof. A second roller element is rotatably received in the second annular groove and bears against the second bowl member. A second ball bearing is rotatably mounted between the second bowl member and the second cone member.

3 Claims, 3 Drawing Sheets

HUB ASSEMBLY FOR A BICYCLE

BACKGROUND OF THE INVENTION

1. Field of the Invention

The present invention relates to a hub assembly, and more particularly to a hub assembly for a bicycle and the like.

2. Related Prior Art

The closest prior art of a hub assembly for a bicycle is disclosed in the Applicant's own copending Patent Application, U.S. Ser. No. 07/893,550, filed Jun. 4, 1992, entitled "HUB ASSEMBLY FOR A REAR WHEEL AXLE OF A BICYCLE" U.S. Pat. No. 5,292,287. However, by such an arrangement, the ball bearings still have to support the principal radial force from the wheel axle alone such that loads exerted on the pair of ball bearings are heavy resulting in that the ball bearings are easily deformed and worn out. In addition, such a structure is essentially secured by threaded engagement between the first cone and the rear wheel axle when by the hub body is apt to become loosened from the wheel axle due to impact and vibration thereon and is not able to rotate normally during long-term utilization.

The present invention has arisen to mitigate and/or obviate the afore-mentioned disadvantages of the conventional hub assembly.

SUMMARY OF THE INVENTION

The primary objective of the present invention is to provide a hub assembly for a bicycle.

Another objective is to provide a hub assembly which has a pair of roller elements to support a radial force from a wheel axle such that loads exerted on ball bearings are largely reduced, so avoiding a deformation thereof.

A further objective is to provide a hub assembly which is not apt to become loosened from the wheel axle due to, impact and vibration and is able to rotate normally even during long-term utilization.

In accordance with one aspect of the present invention, there is provided a hub assembly for a bicycle comprising an axle having a first end and a second end each having an outer thread formed on a peripheral portion thereof. A hub member is rotatably mounted around the axle. A first bowl member and a second bowl member are respectively mounted in first and second end portions of the hub member. A first cone member is threadedly engaged on the first end of the axle and has a first annular groove defined on an outer, peripheral surface thereof. A first roller element is rotatably received in the first annular groove and bears against the first bowl member. A first ball bearing is rotatably mounted between the first bowl member and the first cone member. A second cone member is threadedly engaged on the second end of the axle and has a second annular groove defined on an outer peripheral surface thereof. A second roller element is rotatably received in the second annular groove and bears against the second bowl member. A second ball bearing is rotatably mounted between the second bowl member and the second cone member.

Further objectives and advantages of the present invention will become apparent from a careful reading of the detailed description provided hereinbelow, with appropriate reference to the accompanying drawings.

DESCRIPTION OF THE PREFERRED EMBODIMENTS

Figure 1:
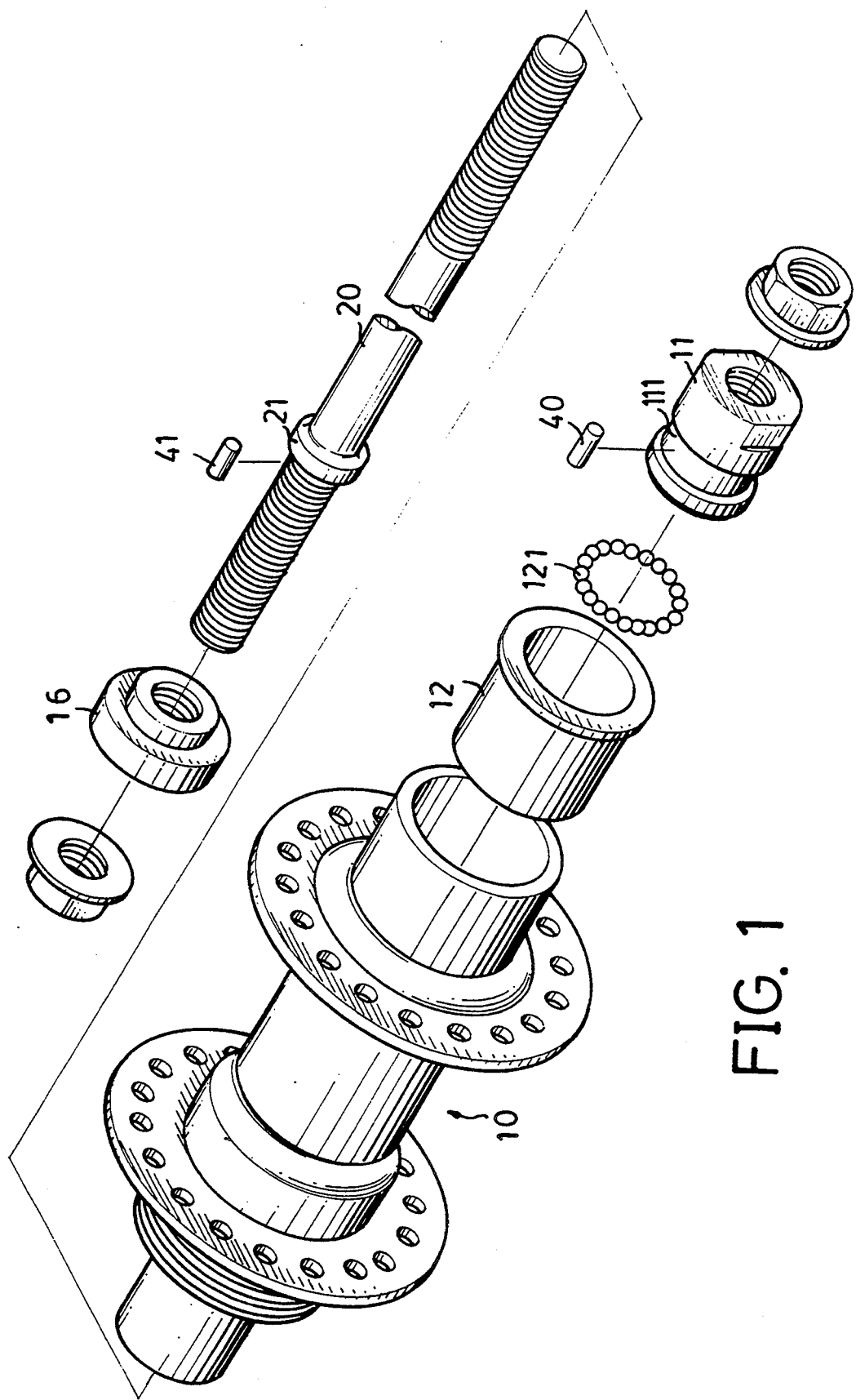
FIG. 1 is an exploded view of a hub assembly for a rear wheel of a multi-speed bicycle in accordance with a first embodiment of the present invention.
Figure 2:
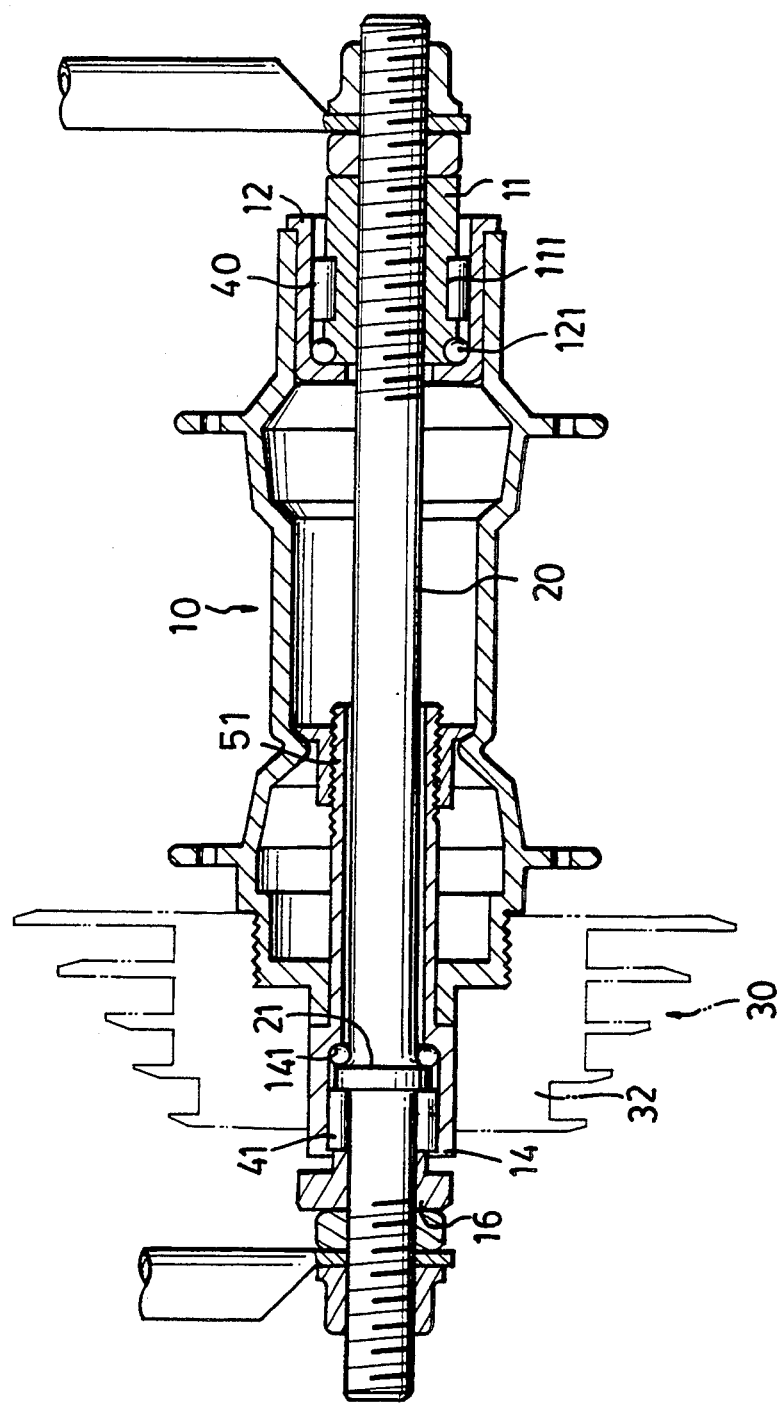
FIG. 2 is a front cross-sectional view of the hub assembly as shown in FIG. 1.

Referring to FIGS. 1 and 2, a hub assembly in accordance with a first embodiment of the present invention is provided for a rear wheel of a multi-speed bicycle and comprises an axle 20 having a first end and a second end each having an outer thread formed on a peripheral portion thereof. A hub member 10 is rotatably mounted around the axle 20 and has a first end portion and a second end portion respectively close to the first and second ends of the axle 20.

A first bowl member 12 and a second bowl member 14 are respectively mounted in the first and second end portions of the hub member 10. A first cone member 11 is threadedly engaged on the first end of the axle 20 and has a first annular groove 111 defined on an outer peripheral surface thereof. A first roller element 40 is rotatably received in the first annular groove 111 of the first cone member 11 and securely bears against the first bowl member 12. A first ball bearing 121 is rotatably mounted between the first bowl member 12 and the first cone member 11.

An annular shoulder 21 is formed on an outer peripheral surface of the second end of the axle 20 and a second ball bearing 141 is rotatably mounted between the second bowl member 14 and the annular shoulder 21. A second cone member 16 is threadedly engaged on the second end of the axle 20 and a second roller element 41 is rotatably mounted between the second cone member 16 and the annular shoulder 21 and bears against the second bowl member 14. It is to be noted that a threaded hole 51 is defined in the second end portion of the hub member 10 and the second bowl member 14 has an outer thread formed on a peripheral portion thereof for being threadedly engaged in the threaded hole 51.

Particularly referring to FIG. 2, as shown by phantom lines, a plurality of sprockets 30 of different sizes are unidirectionally and rotatably mounted on a sleeve member 32 which has one end portion threaded engaged on an outer thread of the second end portion of the hub member 10 such that the hub member 10 is able to be driven to rotate relative to the axle 20 and the first and second cone members 11 and 16 by the sprockets 30. The sprockets 30 and the sleeve member 32 are commercially available and will not be described in further detail.

Figure 3:
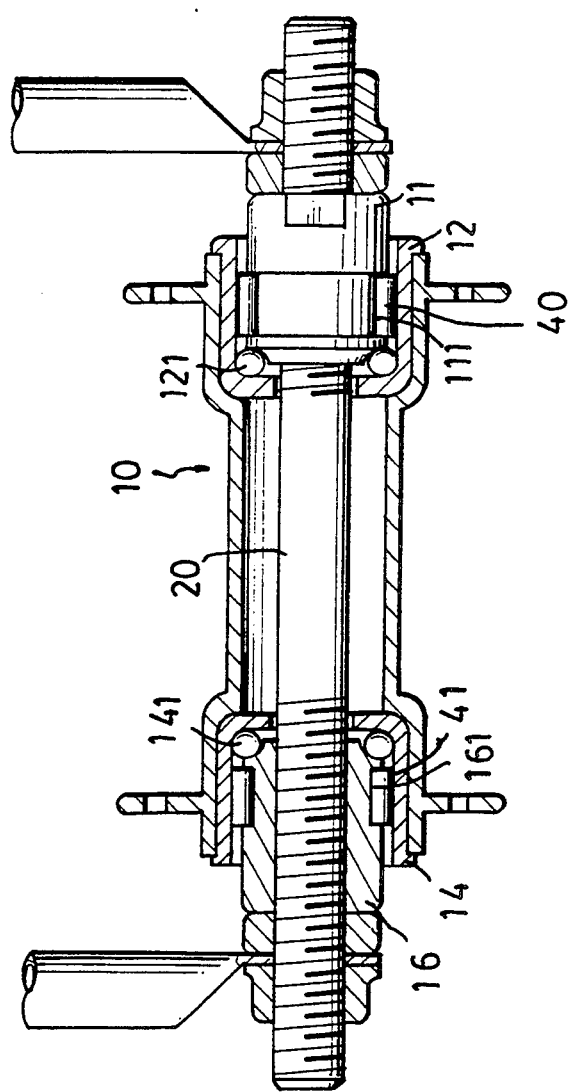
FIG. 3 is a front cross-sectional view of a hub assembly for a front wheel of a bicycle in accordance with a second embodiment of the present invention.

Referring to FIG. 3, a hub assembly in accordance with a second embodiment of the present invention is provided for a front wheel of a bicycle and comprises an axle 20 having a first end and a second end each having an outer thread formed on a peripheral portion thereof. A hub member 10 is rotatably mounted around the axle 20 and has a first end portion and a second end portion respectively close to the first and second ends of the axle 20.

A first bowl member 12 and a second bowl member 14 are respectively mounted on the first and second end portions of the hub member 10. A first cone member 11 is threadedly engaged on the first end of the axle 20 and has a first annular groove 111 defined on an outer peripheral surface thereof. A first roller element 40 is rotatably received in the first annular groove 111 and securely bears against the first bowl member 12. A first ball bearing 121 is rotatably mounted between the first bowl member 12 and the first cone member 11.

A second cone member 16 is threadedly engaged on the second end of the axle 20 and has a second annular groove 161 defined on an outer peripheral surface thereof. A second roller element 41 is rotatably received in the second annular groove 161 and securely bears against the second bowl member 14. A second ball bearing 141 is rotatably mounted between the second bowl member 14 and the second cone member 16.

Accordingly, by such an arrangement, a hub assembly in accordance with the present invention provide a pair of roller elements rotatably mounted in two end portions of the hub member to support the radial force from the wheel axle such that loads exerted on the pair of ball bearings are largely reduced, so avoiding a deformation thereof. In addition, the threaded engagement between the second bowl member and the threaded hole of the hub member ensures a secure engagement such that the hub assembly is not apt to become loosened from the wheel axle due to impact and vibration thereon and is able to rotate normally even during long-term utilization.

It should be clear to those skilled in the art that further embodiments of the present invention may be made without departing from the teachings of the present invention.

I claim:

1. A hub assembly for a bicycle comprising:
   an axle (20) having a first end and a second end, each of said first and second ends defining an outer thread formed on a peripheral portion thereof;
   a hub member (10) rotatably mounted around said axle (20) and having a first end portion and a second end portion;
   a first bowl member (12) and a second bowl member (14) respectively mounted in said first and second end portions of said hub member (10);
   a first cone member (11) threadedly engaged on said first end of said axle (20) and having a first annular groove (111) defined on an outer peripheral surface thereof;
   a first roller element (40) rotatably received in said first annular groove (111) and bearing against said first bowl member (12);
   a first ball bearing (121) rotatably mounted between said first bowl member (12) and said first cone member (11);
   a second cone member (16) threadedly engaged on said second end of said axle (20) and having a second annular groove (161) defined on an outer peripheral surface thereof;
   a second roller element (41) rotatably received in said second annular groove (161) and bearing against said second bowl member (14); and
   a second ball bearing (141) rotatably mounted between said second bowl member (14) and said second cone member (16).

2. A hub assembly for a bicycle comprising:
   an axle (20) having a first end and a second end, each of said first and second ends defining an outer thread formed on a peripheral portion thereof;
   a hub member (10) rotatably mounted around said axle (20) and having a first end portion and a second end portion;
   a first bowl member (12) and a second bowl member (14) respectively mounted in said first and second end portions of said hub member (10);
   a first cone member (11) threadedly engaged on said first end of said axle (20) and having a first annular groove (111) defined on an outer peripheral surface thereof;
   a first roller element (40) rotatably received in said first annular groove (111) and bearing against said first bowl member (12);
   a first ball bearing (121) rotatably mounted between said first bowl member (12) and said first cone member (11);
   an annular shoulder (21) formed on an outer peripheral surface of said second end of said axle (20);
   a second ball bearing (141) rotatably mounted between said second bowl member (14) and said annular shoulder (21);
   a second cone member (16) threadedly engaged on said second end of said axle (20); and
   a second roller element (41) rotatably mounted between said second cone member (16) and said annular shoulder (21) and bearing against said second bowl member (14).

3. The hub assembly for a bicycle in accordance with claim 2, further comprising a threaded hole (51) defined in said second end portion of said hub member (10), said second bowl member (14) having an outer thread formed on a peripheral portion thereof for being threadedly engaged in said threaded hole (51).

* * * * *